(No Model.)
J. BERNEIS.
SEALING DEVICE FOR BOTTLE STOPPERS.
No. 603,035. Patented Apr. 26, 1898.
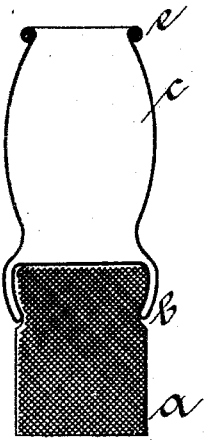
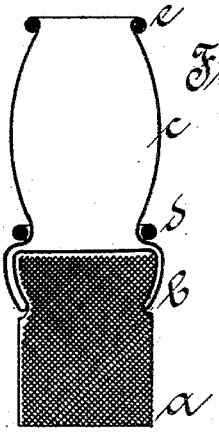
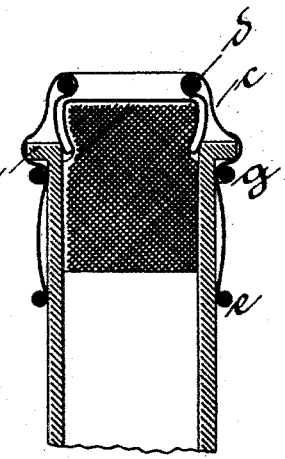
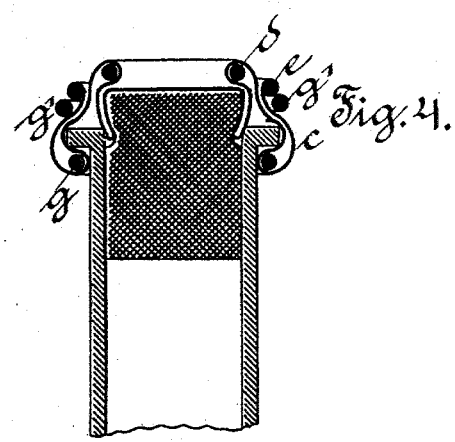
Witnesses
Inventor
Josef Berneis
by Eustace & Hopkins
att'y.

UNITED STATES PATENT OFFICE.

JOSEF BERNEIS, OF LANGENBIELAU, GERMANY.

SEALING DEVICE FOR BOTTLE-STOPPERS.

SPECIFICATION forming part of Letters Patent No. 603,035, dated April 26, 1898.

Application filed November 5, 1897. Serial No. 657,533. (No model.)

*To all whom it may concern:*

Be it known that I, JOSEF BERNEIS, a subject of the Emperor of Germany, and a resident of Langenbielau, in the Empire of Germany, have invented certain new and useful Improvements in Sealing Devices for Bottle-Stoppers, of which the following is a full, clear, and exact description.

The present invention relates to an absolutely air-tight sealing-bag for bottle-stoppers, on which an air-tight sealing is attained by a rubber sleeve, and whereby, furthermore, the great advantage is obtained that the liquid contained in the bottle does not come in contact with the said rubber sleeve, which is of great importance for many liquids.

The arrangement of the rubber sleeve is illustrated on the annexed drawings, showing four sections in Figures 1, 2, 3, and 4 of the rubber sleeve in connection with the bottle-stopper.

The cork $a$ is provided with a groove $b$, in which the rubber sleeve $c$ is arranged, as shown in Fig. 1. In order that the rubber sleeve may be fastened therein, a wire $d$, Fig. 2, is pushed over the same, Fig. 2. Thereafter the cork is put into the neck of the bottle and the rubber sleeve turned down over the rim of the bottle-neck, Fig. 3, whereas said rubber sleeve is held in this position by pushing thereover a rubber ring $g$. Then the rubber sleeve is $c$ turned up over the rim of the bottle-neck $n$ again, Fig. 4, and immediately above said rim $n$ a ring $g'$, of india-rubber, is pushed, so that now a very tight sealing is obtained.

In order that a sliding off of the rubber ring $g'$ may be prevented, a thick ring $e$ is arranged at the end of the rubber sleeve $c$.

I claim as my invention—

A sealing device for bottle-stoppers thereby so characterized that the cork $a$ is combined with a rubber sleeve $c$, being in engagement with a circumferential groove of the cork $a$ and adapted to be held by means of a rubber ring $d$, arranged immediately above the stopper, said rubber sleeve being adapted to be turned over twice, downwardly and upwardly respectively, thus covering the rim of the bottle-neck $h$, whereby it is held in position by rubber rings $g$ and $g'$.

In testimony whereof I have signed my name to this specification in the presence of two subscribing witnesses.

JOSEF BERNEIS.

Witnesses:
 ERNST KATZ,
 HERMANN BARTSCH.